Sept. 25, 1945.　　　　　S. K. LESSEY　　　　　2,385,455
SYSTEM FOR CONTROLLING CHARGING OF STORAGE BATTERIES
Filed March 24, 1944
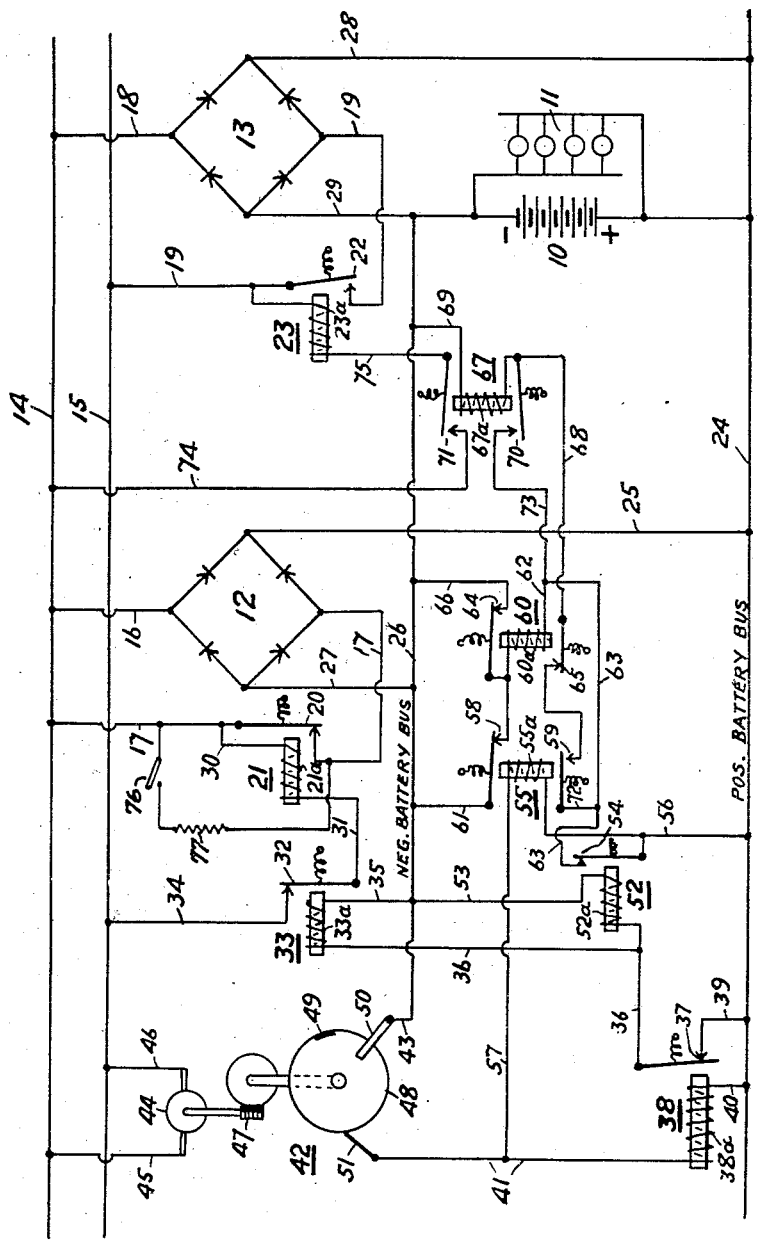
WITNESS:
INVENTOR
Samuel K. Lessey
BY
Augustus B. Boughton
ATTORNEY.

Patented Sept. 25, 1945

2,385,455

UNITED STATES PATENT OFFICE 2,385,455

SYSTEM FOR CONTROLLING CHARGING OF STORAGE BATTERIES

Samuel K. Lessey, Chappaqua, N. Y., assignor to The Electric Storage Battery Company, a corporation of New Jersey Application March 24, 1944, Serial No. 527,863

8 Claims. (Cl. 320—22)

This invention relates to systems for controlling the charging of storage batteries, and more particularly to systems in which a plurality of charging sources is provided.

An object of the invention is to provide, in a system including a storage battery and a plurality of charging sources, means for automatically and at predetermined time intervals connecting one of the charging sources to the battery, means for automatically connecting an additional charging source to the battery to provide for unusually heavy load conditions, and means responsive to battery voltage for disconnecting both charging sources from the battery.

A further object of the invention is to provide a charge control system whereby the results above cited may be accomplished by means of simple and comparatively inexpensive devices.

The invention comprises a storage battery and its load circuit, at least two sources of charging current, means for periodically and at predetermined time intervals connecting one of the charging sources to the battery, other means responsive to unusually heavy load conditions for connecting a second charging source to the battery in parallel with the first charging source, and means responsive to battery voltage for disconnecting from the battery whatever charging source or sources are connected.

The invention will be more clearly understood by reference to the following description and the accompanying drawing in which the single figure illustrates diagrammatically an embodiment of the invention.

Referring to the diagram, 10 represents a storage battery connected to its load circuit 11. Numerals 12 and 13 represent, respectively, a first and second charging source, here shown as fullwave rectifiers, of which 12 is connected to the A. C. circuit 14, 15 via conductors 16 and 17 respectively, and rectifier 13 is connected to said A. C. circuit via conductors 18 and 19. Interposed in conductor 17 are the contacts 20 of contactor 21 and in conductor 19 are the contacts 22 of contactor 23, whereby the rectifiers 12 and 13 may be connected to and disconnected from the A. C. circuit.

The D. C. terminals of rectifier 12 are connected to the positive battery bus 24 via conductor 25, and to the negative bus 26 via conductor 27, and the D. C. terminals of rectifier 13 are connected to the buses 24 and 26 via conductors 28 and 29, respectively.

The exciting coil 21a of contactor 21 is connected to the A. C. circuit 14, 15 via conductors 30 and 17 on the one side and on the other side via conductor 31, contacts 32 of relay 33 and conductor 34. The exciting coil 33a of relay 33 is connected to the battery bus 26 via conductor 35 and to battery bus 24 via conductor 36, contacts 37 of battery voltage responsive relay 38 and conductor 39. The exciting coil 38a of relay 38 is connected on the one side to the battery bus 24 via conductor 40 and on the other side to battery bus 26 via conductor 41, contacts of timer 42 and conductor 43.

Timer 42 comprises the synchronous motor 44 connected across the A. C. circuit 14, 15 via conductors 45 and 46, respectively. Through the worm gear 47 the synchronous motor drives the timing disk 48 of electrically conducting material except for the peripheral insert of insulating material 49. The brush 50 is in continuous contact with the conducting portion of the disk 48 while the brush 51 makes contact with the periphery so that, once in each revolution of the timing disk, the circuit between the brushes 50 and 51 is interrupted by the passage of the insulating insert 49 under brush 51. The timer is so designed that this interruption of the circuit will occur at the desired frequency, say once an hour or once every two hours, or at any other predetermined time interval suitable for the operating conditions to be met.

The mode of operation of that part of the apparatus above described is as follows:

When the circuit between conductors 41 and 43 is closed through the timing disk 48, current will flow through the exciting coil 38a of relay 38 from the battery positive bus 24, conductor 40, coil 38a, conductor 41, brush 51, disk 48, brush 50 and conductor 43 and bus 26 to the battery negative. If the voltage of the battery is below that corresponding to the rapid rise of voltage at the beginning of gassing toward the end of charge, the relay 38 will not attract its armature and the contacts 37 will remain closed. This will permit current to flow from the battery bus 24 via conductor 39, contacts 37, conductor 36, coil 33a and conductor 35 to bus 26. The contacts 32 of relay 33 will, therefore, remain closed and current will flow through the exciting coil 21a of contactor 21 from the A. C. circuit 14, 15 via conductors 17 and 30, coil 21a, conductor 31, contacts 32 and conductor 34. This will hold the contacts 20 of contactor 21 closed, thus keeping the rectifier 12 connected to the A. C. circuit via conductors 16 and 17 and contacts 20, and the charging of the battery through rectifier 12 via conductors 25 and 27 will continue.

If, while the exciting circuit of relay 38 is closed through the timing disk 48, the voltage of the battery rises to a value corresponding to that of the steep part of the charging curve toward the end of charge, say about 2.4 volts per cell, the excitation of relay 38 will be sufficient to attract its armature and open the contacts 37. This will open the exciting circuit of relay 33, thus opening the contacts 32 and interrupting the exciting circuit of contactor 21, thereby opening the charging circuit at contacts 20. Relay 38 is so designed that, after its excitation has increased to a value sufficient to attract its armature and open its contacts 37, a much lower excitation, below that due to the reduced battery voltage resulting from discharge, will be required to release its armature, so that the contacts 37, once opened, will remain open regardless of any normal drop in battery voltage, until the exciting circuit of coil 38a is opened at the timing disk.

As the timing disk 48 continues to rotate, the insulating insert 49 will be brought under the brush 51, thus opening the exciting circuit of relay 38 and resetting this relay by allowing the contacts 37 to close. This will re-establish the charging circuit by closing the contacts 32 of relay 33 and thereby closing the contacts 20 of contactor 21.

After the charging circuit has been opened by the operation of relay 38, as above described, if the battery is not subjected to any appreciable amount of discharge before relay 38 is released and contacts 37 are closed, thus re-establishing the charging circuit, the ensuing rise of battery voltage will quickly operate relay 38 and again open the charging circuit. If, however, the load conditions are such that, after opening the charging circuit as a result of the operation of relay 38, the battery is subjected to considerable discharge, a longer time will elapse after charging is restored by the rotation of the timing disk before the battery voltage rises to a value which will operate relay 38 and again open the charging circuit. Obviously, instead of completely opening the charging circuit by contactor 21, the charging current may be reduced to a low value by any means well known to those skilled in the art without interfering with the accomplishment of the results sought by the applicant. For example, by closing switch 76, the resistor 77 may be connected across the contacts 20, so that when these contacts are opened the charging current will be reduced to a small value but not entirely interrupted.

The apparatus thus far described is well known in the art and is disclosed in Patent 1,786,280 to Woodbridge.

Under unusually heavy load conditions, the value of charging current delivered by charging source 12, after the charging circuit is re-established by the release of relay 38, may not exceed the load on the battery during that period by an amount sufficient to bring the battery voltage to a value sufficient to operate relay 38 before the rotation of the timing disk 48 again opens the exciting circuit of relay 38; or the load may exceed the value of charging current delivered by source 12, so that the battery will receive no charge but will be actually discharging. To avoid this result, there is provided, according to this invention, a second charging source 13 and additional apparatus for automatically connecting said source to the battery under unusually heavy load conditions, as follows:

At 52 is shown a relay whose exciting coil 52a is connected across the battery 10 via bus 24, conductor 39, contacts 37, conductor 36, coil 52a, conductor 53 and bus 26. The contacts 54 of relay 52 are closed when this relay is excited. Relay 55 is provided with a coil 55a excited from the battery via bus 24, conductor 56, coil 55a, conductors 57 and 41, timing disk 48, conductor 43 and bus 26. Relay 55 is provided with contacts 58 which are closed when the relay is excited, and with contacts 59 which are opened when the relay is excited. Relay 60 is provided with an exciting coil 60a connected across the battery via bus 26, conductor 61, contacts 58, coil 60a, conductors 62 and 63, contacts 54, conductor 56 and bus 24. Relay 60 is provided with contacts 64 and 65, both of which are closed when the relay is excited. The exciting coil 60a may also receive current from the battery via bus 24, conductor 56, contacts 54, conductors 63 and 62, coil 60a, contacts 64, conductor 66, and bus 26. Thus, so long as contacts 54 remain closed, the excitation of relay 60, after being established by the closing of contacts 58, will be maintained through contacts 64 after contacts 58 have opened.

Relay 67 is provided with an exciting coil 67a supplied with current from the battery via bus 24, conductor 56, contacts 54, conductors 63 and 72, contacts 59 and 65, conductor 68, coil 67a, conductor 69 and bus 26. Relay 67 is provided with contacts 70 and 71, both of which are closed when the relay is excited. The excitation of relay 67 will be maintained after its contacts are once closed, via bus 24, conductor 56, contacts 54, conductors 63 and 73, contacts 70, coil 67a, conductor 69 and bus 26.

The exciting coil 23a of contactor 23 is provided with current from the A. C. circuit 14, 15 via conductor 74, contacts 71, conductor 75, coil 23a, and conductor 19.

The mode of operation of the additional apparatus for controlling the second charging source 13, as above described, is as follows:

If the contacts 37 of relay 38 are opened in response to rise of battery voltage before the insulating insert 49 of the timing disk passes under brush 51 and opens the circuit between conductors 41 and 43, the excitation of relay 52, which may be called a conditioning relay, will be interrupted and contacts 54 will open. This will interrupt the excitation of intermediate relay 60 and open the contacts 64 and 65. The excitation of intermediate relay 55 will not be interrupted until the insulating insert 49 passes under brush 51, so that contact 58 will remain closed and contact 59 will be open. The exciting circuits of relay 67 will be open at contacts 54 as well as at contacts 65 and 59. The contacts 71 being thus open, the excitation of contactor 23 will be interrupted and the contacts 22 will be open, leaving charging source 13 disconnected.

When the rotation of the timer disk opens the circuit between conductors 41 and 43 after relay 38 has operated to open the contacts 37, the exciting circuit of relay 55 will be opened, permitting contacts 58 to open and contacts 59 to close. While the opening of circuit 41, 43 at the timing disk will also open the exciting circuit of relay 38, permitting the contacts 37 to close, thus closing the exciting circuit of relay 52 and thereby closing contacts 54, this will require a slightly longer time than the opening of contacts 58, so that the closing of contacts 54 cannot re-establish the excitation of relay 60, and, therefore, the second charging source 13 will remain disconnected.

If, however, during the rotation of the timing disk the battery voltage has failed to rise to the value required to operate relay 38, owing to the unusually heavy load conditions above referred to, the contacts 37 will remain closed when the circuit 41, 43 is interrupted at the timing disk, so that, while the interruption of circuit 41, 43 will open the exciting circuit of relay 55, permitting contacts 58 to open and contacts 59 to close, the opening of contacts 58 will not interrupt the exciting circuit of relay 60 via bus 24, conductor 56, contacts 54, conductors 63 and 62, coil 60a, contacts 64, conductor 66 and bus 26; for contacts 54 have remained closed by reason of the sustained excitation of relay 52 via contacts 37. Under these conditions, contacts 65, 59 and 54 being closed, relay 67 will be excited, thus closing contacts 71 to excite contactor 23 and connect to the A. C. circuit the second charging source 13, whose output will be added to that of the first charging source 12, thereby increasing the charging rate to the battery to compensate for the increased load.

Charging source 13 will thus remain in operation in addition to source 12 independently of the operation of the timing disk until the battery voltage rises sufficiently to open the contacts 37. When this occurs, the excitation of relay 33 will be interrupted, thus opening contacts 32 and interrupting the excitation of contactor 21, thereby disconnecting charging source 12; also the excitation of relay 52 will be interrupted at contacts 37, opening contacts 54, thus interrupting the exciting circuits of relay 67, thereby disconnecting charging source 13. The battery will then receive no further charge until circuit 41, 43 is interrupted at the timing disk, which will re-connect charging source 12, thus re-establishing normal charging conditions. If the load conditions still remain sufficiently heavy, charging source 13 will again be connected upon the next interruption of circuit 41, 43.

As pointed out above, an important feature of the charging system described is the time delay between the opening of contacts 58 resulting from the interruption of circuit 41, 43 at the timing disk and the closing of contacts 54 to establish the exciting circuit of relay 60 after contacts 37 have been closed to excite relay 52. This time delay is assured by the fact that contacts 58 are opened instantly upon the interruption of excitation of relay 55, while the closing of contacts 54 must await the travel of the armature of relay 38 from the attracted to the released position to close contacts 37, to be then followed by the building up of excitation of relay 52 and the subsequent travel of its armature from the released to the attracted position. This time delay can be readily assured by the design of the relays in accordance with principles well known to those skilled in the art.

While rectifiers have been shown in the above description as illustrative of suitable charging sources, it will be obvious that other well known apparatus may be substituted for supplying the charging current.

It will be obvious to those skilled in the art that modifications may be made in details of construction and arrangement without departing from the spirit of the invention.

I claim:

1. In a control circuit for a battery charging system comprising a charging source, a storage battery and a transmission circuit for transmitting charging current from the source to the battery whereof at least a portion comprises two parallel paths whereof the first is normally closed to transmit a normal charging current to the battery and the second is normally open, the combination of, means responsive to a predetermined high battery voltage for reducing the normal current through the first path, timing means for intermittently re-establishing the normal current through said first path, and means controlled by the timing means and responsive to failure of the voltage responsive means to reduce said normal current, for closing said second normally open path, said voltage responsive means adapted in response to said predetermined high battery voltage simultaneously to reduce the current in said first path and open the second.

2. In a charge control circuit for a storage battery, the combination with the battery and its load circuit of two sources of charge current, means for causing the transmission of charging current to the battery from said sources, voltage responsive means for controlling the operation of said first-mentioned means to reduce the transmission of charging current to the battery when the battery voltage reaches a predetermined value, timing means for periodically controlling the operation of said first-mentioned means to cause the transmission of full charging current from one of said sources to said battery even though said battery had attained said predetermined voltage and said voltage responsive means had operated, and means responsive to the operation of said timing means and the failure of said voltage responsive means to operate in the period of said timing means for causing the transmission to the battery of full charging current from both charging sources.

3. A control circuit for a battery charging system consisting of a battery connected to a source of direct current of two values, comprising means for normally subjecting the battery to the charging current of lower value, voltage responsive means for controlling the flow of charging current in response to battery voltage, timing means for periodically subjecting said battery to charging current independently of the voltage of said battery, relay means responsive to the position of said voltage responsive means at the instant of operation of said timing means for controlling the value of the charge current applied to the battery, and relay means conditioned by the failure of said voltage responsive means to operate in the period of said timing means for subjecting said battery to the charging current of higher value upon operation of said timing means.

4. A control circuit for a battery charging system consisting of a battery, its load circuit, and a source of charging current of two values comprising, means for subjecting the battery to the charging current of either value, voltage responsive means for controlling said first-mentioned means, to reduce the value of said charging current in response to a predetermined high battery voltage, timing means for periodically subjecting the battery to the lower of said two values if said voltage responsive means has operated, and means made operative by the timing means and responsive to the failure of said voltage responsive means to operate in the period of said timing means for subjecting the battery to the higher of said two values.

5. In a charge control circuit for a storage battery, the combination with the battery and its load circuit of two charging sources, means for actuating said charging sources to cause the transmission of charging current to the battery from each source, voltage responsive means for controlling said actuating means to disconnect the connected charging sources when the battery voltage reaches a predetermined high value, means for periodically and at predetermined time intervals re-connecting at least one of said charging sources even though said voltage responsive means has operated, and means actuated by said periodic means for connecting both charging sources if upon operation of said time controlled means said voltage responsive means has not operated to disconnect the connected charging sources.

6. In a charge control system for a storage battery, the combination with the battery and its load circuit of two charging sources, circuit connections for establishing and interrupting the transmission of charging current from each source to the battery, means responsive to elevated battery voltage near the completion of charge for opening such of said circuit connections as are established, means for periodically and at predetermined time intervals re-establishing said circuit connections for one of said charging sources when opened by the battery voltage responsive means, and means for establishing the circuit connections for the second charging source, said means responsive to the failure of the voltage responsive means to open the circuit connection for said one charging source as a result of unusually heavy load conditions during any one of said time intervals.

7. In a charge control system for a storage battery, the combination with the battery and its load circuit of two charging sources, circuit connections for establishing and interrupting the transmission of charging current from each source to the battery, means responsive to battery voltage for opening such of said circuit connections as are established, means for periodically and at predetermined time intervals re-establishing said circuit connections for one of said charging sources when opened by the battery voltage responsive means, and means actuated by the operation of the said periodic means for establishing the circuit connections for the second charging source if the circuit connections for the first charging source have not been opened by the battery voltage responsive means.

8. In a control circuit for a battery charging system comprising a source of charging energy, a storage battery and two parallel paths including appropriate electrical conducting circuits for the transmission of said energy to the battery, the combination of, a first charge control relay having an exciting circuit connected across the battery whose normally closed contacts are adapted to be opened in response to a predetermined high battery voltage to thereby effect the interruption of the conducting circuit of the first of said paths, a timing device adapted periodically to interrupt the exciting circuit of said first charge control relay, a second charge control relay having contacts adapted to close when said relay is excited to effect the completion of the conducting circuit of the second of said paths, a first and a second intermediate relay and a conditioning relay controlling respectively three pairs of contacts interposed in series in the exciting circuit of the second charge control relay, whereof the contacts controlled by the conditioning relay and the second intermediate relay are closed and those controlled by the first intermediate relay are opened when said relays are respectively excited, an exciting circuit for the conditioning relay in which the contacts of the first charge control relay are interposed, an exciting circuit for the first intermediate relay adapted to be opened periodically by the timing device simultaneously with its opening of the exciting circuit of the first charge control relay, an exciting circuit for the second intermediate relay including in series relation the contacts of the conditioning relay and contacts closed by the first intermediate relay when said relay is excited, and holding excitation circuits for the second intermediate relay and the second charge control relay, respectively, each of said circuits including a contact held closed by its respective relay when excited, and both of said two holding excitation circuits controlled in parallel by the contacts of the conditioning relay.

SAMUEL K. LESSEY.